United States Patent [19]

Tezuka et al.

[11] Patent Number: 5,292,568
[45] Date of Patent: Mar. 8, 1994

[54] OPTICAL DISK HAVING A HARD COAT LAYER

[75] Inventors: Shin-ichi Tezuka; Tsuneo Kuwahara, both of Nagano, Japan

[73] Assignee: TDK Corporation, Tokyo, Japan

[21] Appl. No.: 773,844

[22] Filed: Oct. 11, 1991

[30] Foreign Application Priority Data

Oct. 12, 1990 [JP] Japan .................. 2-274879

[51] Int. Cl.$^5$ ............................................. B32B 03/02
[52] U.S. Cl. ........................................ 428/64; 428/65; 428/206; 428/323; 428/412; 428/702; 428/913; 346/135.1; 369/283; 369/288
[58] Field of Search .............. 369/283, 288; 346/76 L, 346/135.1; 430/523, 527, 945; 428/64, 65, 206, 328, 412, 913, 694 S, 323, 702

[56] References Cited

U.S. PATENT DOCUMENTS

| | | | |
|---|---|---|---|
| 4,418,141 | 11/1983 | Kawaguchi et al. | 430/527 |
| 4,590,493 | 5/1986 | Inoue et al. | 369/283 |
| 4,895,767 | 1/1990 | Mori et al. | 428/447 |
| 4,904,525 | 2/1990 | Taniguchi et al. | 428/328 |
| 4,937,148 | 6/1990 | Sato et al. | 428/328 |
| 5,165,992 | 11/1992 | Yajima | 428/328 |
| 5,176,943 | 1/1993 | Woo | 428/64 |
| 5,213,887 | 5/1993 | Huffman | 428/323 |

FOREIGN PATENT DOCUMENTS 165050 8/1989 Japan .

*Primary Examiner*—Patrick J. Ryan
*Assistant Examiner*—Marie R. Macholl
*Attorney, Agent, or Firm*—Watson, Cole, Grindle & Watson

[57] ABSTRACT

An optical disk includes a resinous substrate and a recording layer thereon. A hard coat layer containing conductive particles is provided on a light incident side of the substrate for protecting the substrate from physical damages and rendering the disk antistatic for preventing dust deposition.

4 Claims, 1 Drawing Sheet

OPTICAL DISK HAVING A HARD COAT LAYER

This invention relates to optical disks, and more particularly, to optical disks having a hard coat layer formed on a surface for protection against damage. Especially, it relates to an improvement in the hard coat layer.

BACKGROUND OF THE INVENTION

Great attention has been paid to optical disks as high capacity information carrying media. Optical disks are generally classified into optical recording disks and read only optical disks. The optical recording disks include rewritable type disks such as magneto-optical recording disks and write-once type disks such as pit formation type optical recording disks, and the read only optical disks include laser disks (LD) and compact disks (CD).

In general, these optical disks comprise a recording or information carrying layer on a substrate. The substrates are often formed of resinous materials, typically polycarbonate and acrylic resins because of light weight, ease of handling, and low cost. The resinous substrates, however, are susceptible to damages or scratches due to their low hardness. Since optical disks are generally recorded or reproduced by directing light through the substrates, damaged or scratched substrates can impose difficulty to the information recording and reproducing operation.

It is then desired to form a hard coat layer on at least the light incident side of substrates for protection against damages and scratches. Such hard coat layers on the light incident side of substrates are known, for example, from Japanese Patent Application Kokai No. 165050/1989 disclosing UV cured films of oligoester acrylate-containing composition. These hard coat layers or UV cured films have a surface resistivity of about $10^{15}$ Ω and are thus susceptible to electrostatic charging. Once the hard coat layers are charged, dust and debris will deposit on the hard coat layer surface, causing errors to occur during recording and reproducing operations.

Attempts for rendering the disks antistatic have been made, for example, by forming a hard coat layer from a surfactant-containing composition to thereby reduce surface resistivity or by forming an antistatic film on a hard coat layer. However, the hard coat layers of a surfactant-containing composition are still insufficient in antistatic effect since they have a relatively high surface resistivity of about $10^{11}$ to $10^{13}$ Ω. The double coating method of forming an antistatic film on a hard coat layer is less efficient in mass production and leaves a problem with respect to the continuity of antistatic effect.

SUMMARY OF THE INVENTION

Therefore, an object of the present invention is to provide a novel and improved optical disk having a hard coat layer which is effective in protecting the substrate from damages and static electricity, ensuring that the disk perform satisfactory recording and reproduction.

The present invention provides an optical disk comprising a resinous substrate having a pair of opposed major surfaces and a recording layer on one major surface. Recording and reproducing light is directed to the recording layer through the substrate. The other major surface of the substrate on which light is incident is designated a light incident surface. A hard coat layer containing electro-conductive particles is provided on at least the light incident surface of the substrate. Preferably, the hard coat layer has a surface resistivity of up to $10^{10}$ Ω and contains 10 to 70% by volume of conductive particles. It is often a radiation cured layer. Also preferably, the conductive particles have a mean particle diameter of 1 to 100 nm and are comprised of oxides of tin, antimony and/or indium.

As defined above, the optical disk of the invention has a hard coat layer containing conductive particles on a surface thereof. The hard coat layer is effective for protecting the substrate from damages or scratches and for rendering the disk antistatic due to its low surface resistivity. Then little dust or debris deposits on the disk surface, and the minimized occurrence of errors ensures satisfactory recording and reproducing operations.

BRIEF DESCRIPTION OF THE DRAWING

The only FIGURE.

DESCRIPTION OF THE PREFERRED EMBODIMENTS

Figure 1:
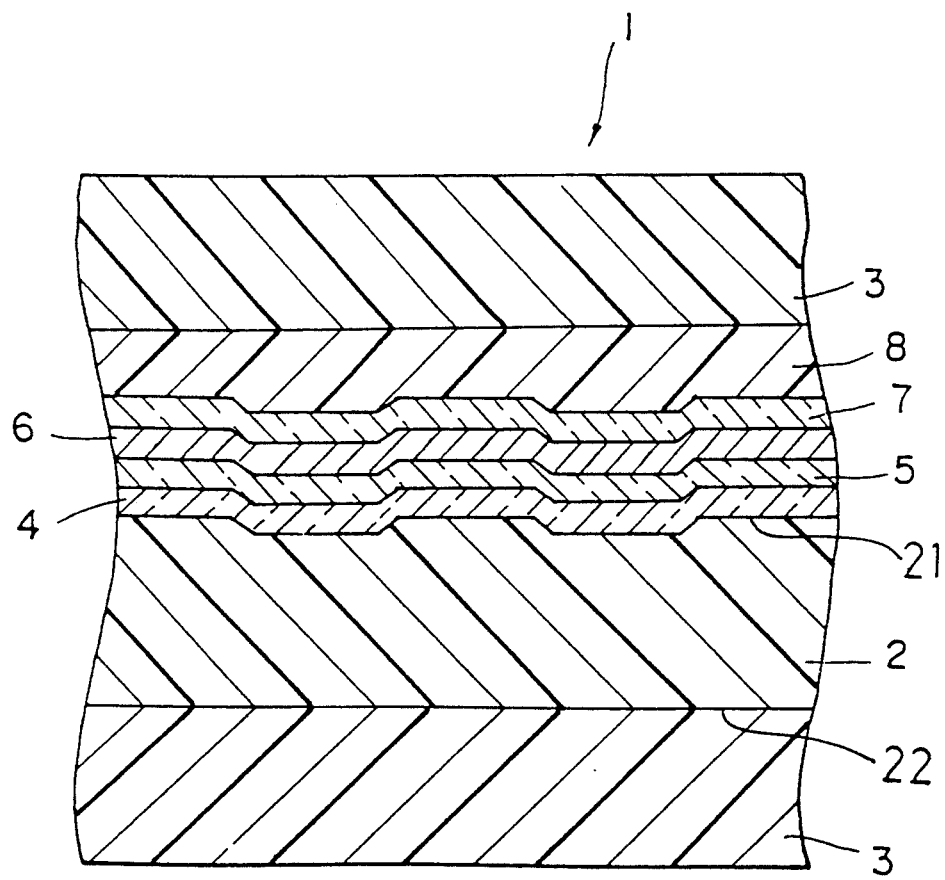
FIG. 1 is a fragmentary cross-sectional view of an exemplary optical disk according to the present invention.

Included in the optical disks contemplated herein are both read only optical disks having information previously carried thereon and recordable optical disks having a recording layer capable of carrying information. In the following description, however, reference is made to a magneto-optical recording disk as a typical example.

Referring to FIG. 1, there is illustrated a magneto-optical recording disk of the one side recording type generally designated at 1 including a substrate 2 having a pair of major surfaces 21 and 22. The disk 1 includes a protective layer 4, an intermediate layer 5, a recording layer 6, a protective layer 7, and a protective coat layer 8 formed on the upper surface 21 of substrate 2 in this order. The disk 1 further includes a hard coat layer 3 on the lower or rear surface 22 of substrate 2 and another hard coat layer 3 on the protective coat layer 8.

According to the present invention, the hard coat layers 3 contain electroconductive particles. The conductive particles should preferably have a resistivity of up to 1 Ω.cm, especially up to $10^{-2}$ Ω.cm in bulk form. Outside this resistivity range, the hard coat layers would become less antistatic. The lower limit of resistivity is not particularly determined although it is usually about $10^{-6}$ Ω.cm. The resistivity is defined in the literature, for example, "Electric and Electronic Materials Handbook", Asakura Shoten.

The conductive particles should preferably have a mean particle diameter of 1 to 100 nm, especially 3 to 30 nm. Conductive particles of a size below this range would be difficult to disperse in a hard coat layer forming composition whereas particles of a size beyond this range would cause a change of light transmittance and light scattering, disturbing recording and reproducing operations. The diameter of conductive particles may be determined by observing particles under a scanning electron microscope (SEM), measuring the projected area of particles, and calculating the diameter of the circle of equal projected area.

No particular limit is imposed on the material of which the conductive particles used herein are made as long as the particles are transparent to recording and reproducing light. In this sense, carbon black and other conductive particles which are opaque to recording and reproducing light are not recommended. Preferred conductive particles are of tin oxide, antimony oxide, antimony oxide-doped tin oxide, and indium tin oxide.

Preferably the hard coat layer 3 contains 10 to 70% by volume, more preferably 20 to 60% by volume, most preferably 30 to 60% by volume of conductive particles. Less anti-static effect is expected below this range whereas excess loadings beyond this range would adversely affect uniform distribution and transparency. The content of conductive particles in the hard coat layer may be determined by observing a layer section under a SEM with 10,000 to 100,000× magnification and determining the area ratio of particles in a region where about 100 to 1000 particles are present.

Further, the hard coat layers containing such conductive particles preferably have a hardness of at last 2H, more preferably at least 3H as measured in pencil hardness at 25° C. according to JIS K-5400. Softer layers below this limit would be less effective in protecting the substrate against damages and scratches. The upper limit of hardness is not particularly determined although it is usually about 6H.

Other than the conductive particles, the hard coat layers may be composed of any desired, non-limiting compositions which are commonly used in forming conventional hard coat layers having a pencil hardness of about 2H to 5H on the surface.

Preferably, the hard coat layers are formed by curing compositions comprising various organic materials, especially by radiation curing compositions comprising radiation-curable compounds.

The radiation-curable compounds used herein include monomers, oligomers, and polymers having incorporated in their molecule a group capable of crosslinking or polymerization upon exposure to radiation, for example, an acrylic double bond as given by acrylic acid, methacrylic acid and their esters which are sensitive to an ionization energy and capable of radical polymerization, an allyl double bond as given by diallyl phthalate, and an unsaturated double bond as given by maleic acid and maleic derivatives. They are preferably polyfunctional, especially at least trifunctional and may be used alone or in admixture of two or more.

The radiation-curable monomers are usually compounds having a molecular weight of lower than 2,000 and the oligomers are those having a molecular weight of 2,000 to 10,000. Exemplary monomers include styrene, ethylacrylate, ethylene glycol diacrylate, ethylene glycol dimethacrylate, diethylene glycol diacrylate, diethylene glycol methacrylate, 1,6-hexaneglycol diacrylate, 1,6-hexaneglycol dimethacrylate, and more preferably pentaerythritol tetraacrylate (and methacrylate), pentaerythritol triacrylate (and methyacrylate), trimethylolpropane triacrylate (and methacrylate), trimethylolpropane diacrylate (and methacrylate), acryl modified products of urethane elastomers (e.g., Nippolane 4040 available from Nippon Polyurethane K. K.), and derivatives thereof having a functional group such as COOH incorporated therein, acrylates and methacrylates of phenol ethylene oxide adducts, compounds having a pentaerythritol fused ring and having an acryl or methacryl group or ε-caprolactone-acryl group attached thereto as disclosed in Japanese Patent Application Kokai No. 165050/1989, and special acrylates as disclosed in Japanese Patent Application Kokai No. 165050/1989.

Examples of the radiation-curable oligomers include oligoester acrylates and acryl modified urethane elastomers and their derivatives having a functional group such as COOH incorporated therein.

In addition to or instead of the above-mentioned compounds, radiation-curable compounds obtained by modifying thermoplastic resins so as to be radiation sensitive may be used. Examples of such radiation-curable resins include thermoplastic resins having incorporated in their molecule a group capable of crosslinking or polymerization upon exposure to radiation, for example, an acrylic double bond as given by acrylic acid, methacrylic acid and their esters having a radically polymerizable unsaturated double bond, an allyl double bond as given by diallyl phthalate, and an unsaturated bond as given by maleic acid and maleic derivatives.

Examples of the thermoplastic resins which can be modified to be radiation curable include vinyl chloride copolymers, saturated polyester resins, polyvinyl alcohol resins, epoxy resins, phenoxy resins, and cellulosic derivatives.

Other resins which can be modified to be radiation curable include polyfunctional polyesters, polyether ester resins, polyvinyl pyrrolidone resins and derivatives thereof (e.g., PVP olefin copolymers), polyamide resins, polyimide resins, phenolic resins, spiroacetal resins, and acrylic resins containing at least one acryl ester and methacryl ester containing a hydroxyl group as a polymerizing component.

Preferably the polymerizable compositions contain photopolymerization initiators since they are cured upon exposure to radiation, especially ultraviolet light. Any desired photopolymerization initiators may be used alone or in admixture by selecting from commonly used initiators such as acetophenone, benzoin, benzophenone, and thioxanthone compounds. Most often, the polymerizable compositions contain about 0.5 to 5% by weight of photopolymerization initiators.

Of course, the polymerizable compositions contain proper amounts of conductive particles such that the particles may provide the above-defined volume ratio after curing.

The polymerizable compositions may be prepared either by synthesizing components by conventional methods or by blending commercially available compounds. Therefore, the hard coat-forming compositions may be obtained by blending conductive particles in polymerizable compositions as prepared above or by using commercially available ones if any.

In the practice of the present invention, the hard coat layers are formed as follows. First, a suitable hard coat-forming composition containing conductive particles is applied to both the rear surface 22 of the substrate 2 and the protective coat layer 8 (see FIG. 1). This coating may be done by any desired well-known technique, for example, spinner coating, gravure coating, spraying, dipping, and combinations thereof. The coating conditions may be determined by taking into account the viscosity of a polymerizable composition, the desired film thickness, and other factors without undue experimentation.

Then, the coating is dried, usually by heating at about 60° to 90° C. After drying, the coating is exposed to radiation. The radiation to which the coating is exposed may be ultraviolet (UV) radiation, electron radiation, or the like, with UV being preferred. As the case may be, the coating is exposed to UV without drying step. Generally, UV light has an intensity of at least about 50 mW/cm² and a dose of about 500 to 2,000 mJ/cm². Mercury lamps and other conventional UV light sources may be used.

Upon exposure to UV, the compounds undergo radical polymerization, forming a cured film as the hard coat layer, which usually has a thickness of about 1 to 30 μm, preferably about 3 to 10 μm. Below this range it would be difficult to form even and durable films. Thicker films above this range tend to crack or cause disk warpage due to shrinkage during curing.

After the hard coat layers 3 are applied, the substrate 2 should preferably have a transmittance of at least 85% with respect to recording and reproducing light.

Further preferably, the hard coat layer has a surface resistivity of up to $10^{10}$ Ω, especially up to $10^9$ Ω. The layer would be less antistatic with a higher surface resistivity above the limit. The lower limit of surface resistivity is not particularly determined although it is usually about $10^2$ Ω. The surface resistivity may be measured in accordance with JIS K-6911.

The hard coat layer need not be provided on each side of the disk. It should be provided on at least the light incident side. In the magneto-optical recording disk of the single side recording type shown in FIG. 1, for example, only the hard coat layer 3 on the substrate rear surface 22 is essential. This is also true in compact disks or the like.

Additionally, the hard coat layers may be formed not only on the major surfaces of an annular optical disk, but also on the outer and inner peripheral surfaces thereof, though not shown.

Now, the construction of the present optical disk other than the hard coat layer 3 is described in detail while referring to FIG. 1 again.

The substrate 2 is of a resinous material which should be transparent to recording and reproducing light because the light is directed to the recording layer 6 through the substrate 2 from the rear surface 22 side thereof. Examples of the substrate material include acrylic resins, polycarbonate resins, epoxy resins, and polyolefin resins. Typically, the substrate is about 0.5 to 3 mm thick and has an outer contour of a disk or any other desired shape. Disk-shaped substrates have an outer diameter of about 50 to 360 mm and an inner diameter of about 10 to 60 mm, often about 15 to 60 mm.

The substrate may be formed from a suitable resin by any well-known method, for example injection molding. Preferably, a predetermined pattern including pits and grooves for tracking and addressing purposes is formed on the substrate surface at the same time as substrate molding. Alternatively, a resin layer having a predetermined pattern including grooves may be formed on the substrate by 2P method or the like.

The protective layers 4 and 7 are provided on the opposite sides of the recording layer 6 for the purpose of improving the corrosion resistance of the recording layer 6. Preferably at least one, more preferably both of the protective layers 4 and 7 are provided. These protective layers are preferably inorganic thin films of various oxides, carbides, nitrides, sulfides, and mixtures thereof. The protective layers preferably have a thickness of about 30 to 300 nm to achieve a corrosion resistance improvement.

The intermediate layer 5 is provided for the purpose of carrier-to-noise (C/N) ratio improvement. It is preferably formed from a dielectric substance selected from oxides, nitrides, sulfides, and mixtures thereof to a thickness of about 30 to 150 nm.

These protective layers 4, 7 and intermediate layer 5 are preferably manufactured by gas phase film formation techniques such as sputtering.

The recording layer 6 is a layer in which information is magnetically recorded by means of a modulated thermal beam or a modulated magnetic field and the recorded information is reproduced through magneto-optical conversion. The material of the recording layer 6 is not particularly limited insofar as magneto-optical recording is possible. Preferably, an alloy of a rare earth metal and a transition metal is vacuum deposited, as by sputtering, evaporation, or ion plating, to form an amorphous film. The recording layer 6 generally has a thickness of about 10 to about 500 nm.

The protective coating 8 is provided for the purpose of improving corrosion resistance and mar resistance. It may be formed from various organic materials, preferably by curing a radiation-curable compound or a composition thereof upon exposure to radiation such as electron radiation and UV. The protective coating 8 is often about 0.1 to 100 μm thick and may be formed by any desired well-known technique, for example, spin coating, gravure coating, spraying, dipping, and combinations thereof.

Although the optical disk of the invention has been described as being embodied by a magneto-optical recording disk of the single side recording type, the present invention is also applicable to optical recording disks of the double side recording type. Such a double side recording disk is obtained by uniting a pair of substrates each having recording and other necessary layers through an adhesive layer such that the recording layers are interposed therebetween. In this embodiment, the hard coat layer is on the rear or outside surface of each substrate, that is, the surface of each substrate remote from its recording layer.

Another disk of the single side recording type can be obtained by providing a protective plate adhesively bonded to the protective coat layer 8 instead of the upper hard coat layer 3 in FIG. 1. Such a protective plate is often of the same material as the substrate 2 although other materials may be used because the protective plate need not be transparent. For bonding there may be used any well-known adhesives, for example, hot melt adhesives, thermosetting adhesives, and anaerobic adhesives.

The present invention is applicable to not only magneto-optical recording disks, but also various other optical recording disks and read only optical disks with equivalent benefits. Included are rewritable disks such as optical recording disks of the phase change type; write-once disks such as optical recording disks of the pit formation type having a so-called air sandwich structure and optical recording disks conforming to the CD standard; and read only optical disks such as laser disks and compact disks.

EXAMPLE

Examples of the invention are given below by way of illustration and not by way of limitation.

EXAMPLE 1

A magneto-optical recording disk of the single side recording type configuration as shown in FIG. 1 was prepared by starting with a polycarbonate substrate 2 which was injection molded and grooves and pits were formed at the same time. A protective layer 4 of glass, an intermediate layer 5 of SiNx, a recording layer 6 of TbFeCo alloy, a protective layer 7 of SiNx, and a protective coat layer 8 of a UV-curable resin were successively formed on the upper surface 21 of the substrate 2 in the stated order. Then, a hard coat-forming composition was applied to both the rear surface 22 of the substrate 2 and the protective coat layer 8 and cured with UV light, forming hard coat layers 3.

In this way, magneto-optical recording disk samples, No. 1 (invention) and No. 2 (comparison), were obtained.

The polycarbonate substrate was a disk having an outer diameter of 86 mm, an inner diameter of 15 mm, and a thickness of 1.2 mm. The protective layers 4, 7, intermediate layer 5, and recording layer 6 were formed by sputtering.

The hard coat layer of sample No. 1 was obtained by dispersing 500 parts by weight of conductive particles in 100 parts by weight of a polymerizable composition, both identified below, applying the resulting hard coat-forming composition by spin coating, heating, and exposing to UV light for curing. The layer had an average thickness of 5 μm after curing.

The hard coat layer of sample No. 2 was obtained by using only the polymerizable composition as a hard coat-forming composition, applying it by spin coating, heating, and exposing to UV light for curing. The layer had an average thickness of 5 μm after curing.

|  | Parts by weight |
|---|---|
| Polymerizable Composition |  |
| Oligoester acrylate (Mw 5000) | 50 |
| PMTPA | 50 |
| Acetophenone photopolymerization initiator | 3 |
| Conductive particles |  |
| Antimony oxide |  |
| mean particle diameter: 10 nm |  |
| bulk resistivity: $10^{-4}$ Ω·cm |  |

The thus obtained hard coat layers of sample Nos. 1 and 2 had a pencil hardness of 3H. The hard coat layer of sample No. 1 contained about 50% by volume of conductive particles.

Both the samples were measured for surface resistance, form which surface resistivity was calculated. The results are shown below.

TABLE 1

| Sample No. | Surface resistivity (Ω) |
|---|---|
| 1 (invention) | $5 \times 10^8$ |
| 2 (comparison) | $2 \times 10^{15}$ |

Next, the samples were subject to a dust test according to JIS D-0207. Using a disk tester OMS-2000 (manufactured by Nakamichi K. K.), the samples were measured for bit error rate under the following conditions both before and after the dust test.

Disk rotation: 1800 rpm
Recording power: 6 mW
Reproducing power: 1 mW
External magnetic field: 300 Oe It was found that sample No. 1 (invention) had an approximately equal bit error rate before and after the dust test. In contrast, sample No. 2 (comparison) showed a considerably increased bit error rate after the dust test.

The effectiveness of the present invention is evident from the experimental results.

Equivalent results were obtained when the conductive particles in the hard coat layer were replaced by tin oxide and indium oxide.

There has been described an optical disk having a hard coat layer containing conductive particles so that the hard coat layer is antistatic. Thus little or no dust adheres to conditions for recording and reproducing. The hard coat layer itself has a sufficiently low surface resistivity to eliminate a need for an extra layer such as an antistatic film and continues to be antistatic for an extended period. Since the hard coat layer is easy to form, the disk of the invention is advantageous for mass production.

Although some preferred embodiments have been described, many modifications and variations may be made thereto in the light of the above teachings. It is therefore to be understood that within the scope of the appended claims, the invention may be practiced otherwise than as specifically described.

We claim:

1. An optical disk comprising a resinous substrate and a hard coat layer on at least a light incident side of the substrate, said hard coat layer having a thickness of 1-30 μm and containing electroconductive particles transparent to recording and reproducing light and having a mean particle diameter of 3 to 30 nm, said hard coat layer comprising 10 to 70% by volume of electroconductive particles.

2. An optical disk as set forth in claim 1 wherein said hard coat layer has a surface resistivity of up to $10^{10}$ Ω.

3. An optical disk as set forth in claim 1 wherein said hard coat layer is a radiation cured one.

4. An optical disk as set forth in claim 1 wherein said electroconductive particles comprise at least one member selected from oxides of tin, antimony and indium.

* * * * *